(12) United States Patent
Kelley et al.

(10) Patent No.: US 7,313,827 B2
(45) Date of Patent: Dec. 25, 2007

(54) APPARATUS AND METHOD FOR ANALYSIS OF CONVERSATIONAL PATTERNS TO POSITION INFORMATION AND AUTONOMIC ACCESS CONTROL LIST MANAGEMENT

(75) Inventors: Edward E. Kelley, Wappingers Falls, NY (US); Tijs Y. Wilbrink, Voorburg (NL); Ellis Zijlstra, Haarlem (NL)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/604,315

(22) Filed: Jul. 10, 2003

(65) Prior Publication Data

US 2005/0010823 A1     Jan. 13, 2005

(51) Int. Cl.
*H04L 29/00* (2006.01)
*G06F 7/04* (2006.01)
(52) U.S. Cl. ............................................ 726/28; 707/6
(58) Field of Classification Search .................. 726/28, 726/29, 30, 15; 707/6
See application file for complete search history.

(56) References Cited

U.S. PATENT DOCUMENTS

| 5,787,175 | A | 7/1998 | Carter | |
|---|---|---|---|---|
| 6,212,534 | B1 | 4/2001 | Lo et al. | |
| 6,357,010 | B1 | 3/2002 | Viets et al. | |
| 6,513,039 | B1* | 1/2003 | Kraenzel | 707/9 |
| 7,047,234 | B2* | 5/2006 | French et al. | 707/3 |
| 7,058,630 | B2* | 6/2006 | Houston et al. | 707/9 |
| 2002/0124053 | A1* | 9/2002 | Adams et al. | 709/216 |
| 2003/0135818 | A1* | 7/2003 | Goodwin et al. | 715/500 |
| 2004/0088325 | A1* | 5/2004 | Elder et al. | 707/104.1 |
| 2004/0254934 | A1* | 12/2004 | Ho et al. | 707/9 |
| 2005/0022005 | A1* | 1/2005 | McKeeth | 713/200 |

* cited by examiner

*Primary Examiner*—Matthew B Smithers
(74) *Attorney, Agent, or Firm*—DeLio & Peterson, LLC; Robert Curcio; Kerry Goodwin

(57) ABSTRACT

A method employing a software application for operation for analyzing conversational patterns between people and teams within an organization, locating inconsistencies in the required and actual access level to knowledge repositories, which ultimately results in dynamically updating access control lists of the knowledge repositories, and having the originator and anticipated users being prompted to further enable informed, fact-based manual control of the access control lists.

27 Claims, 16 Drawing Sheets

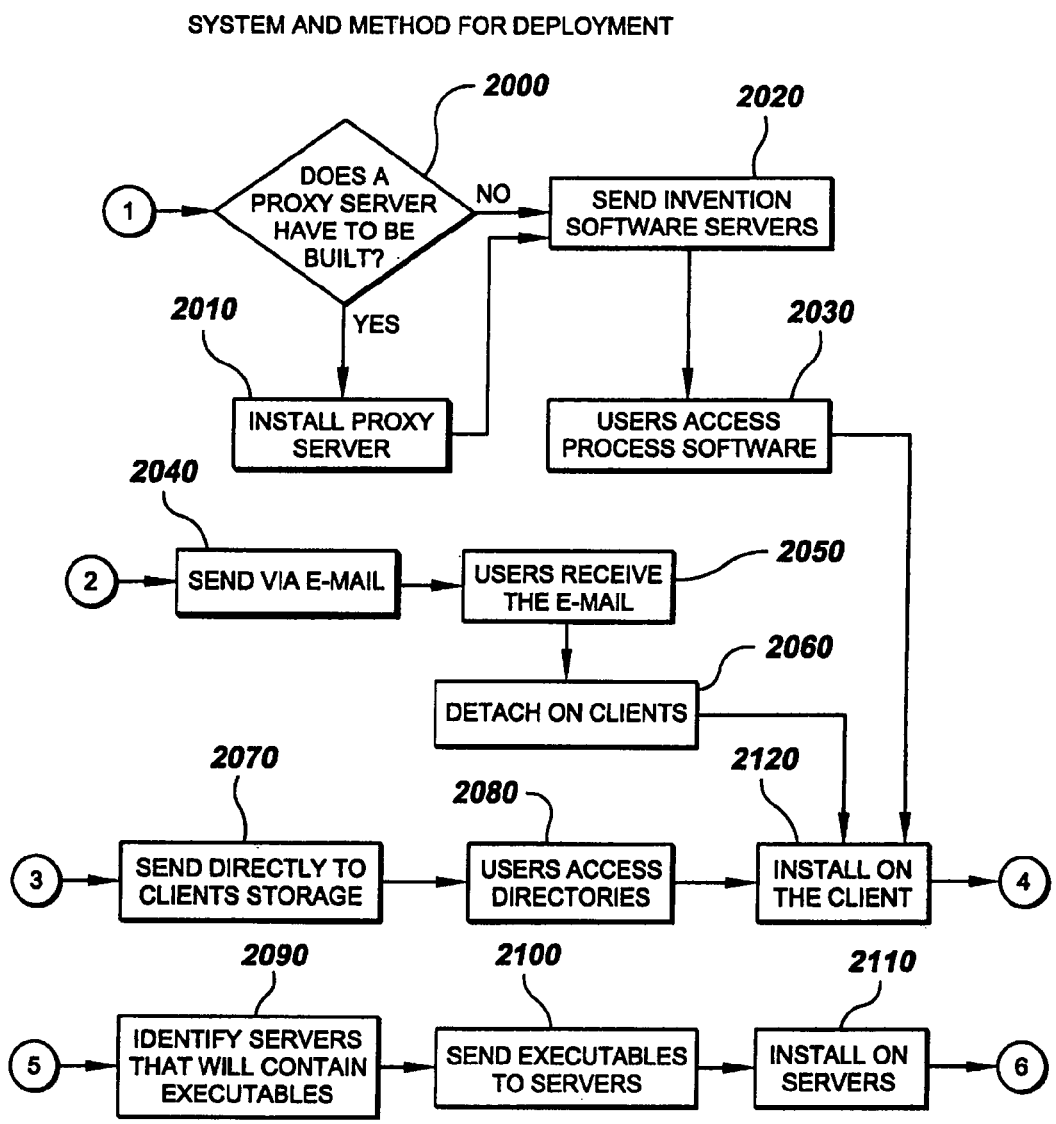

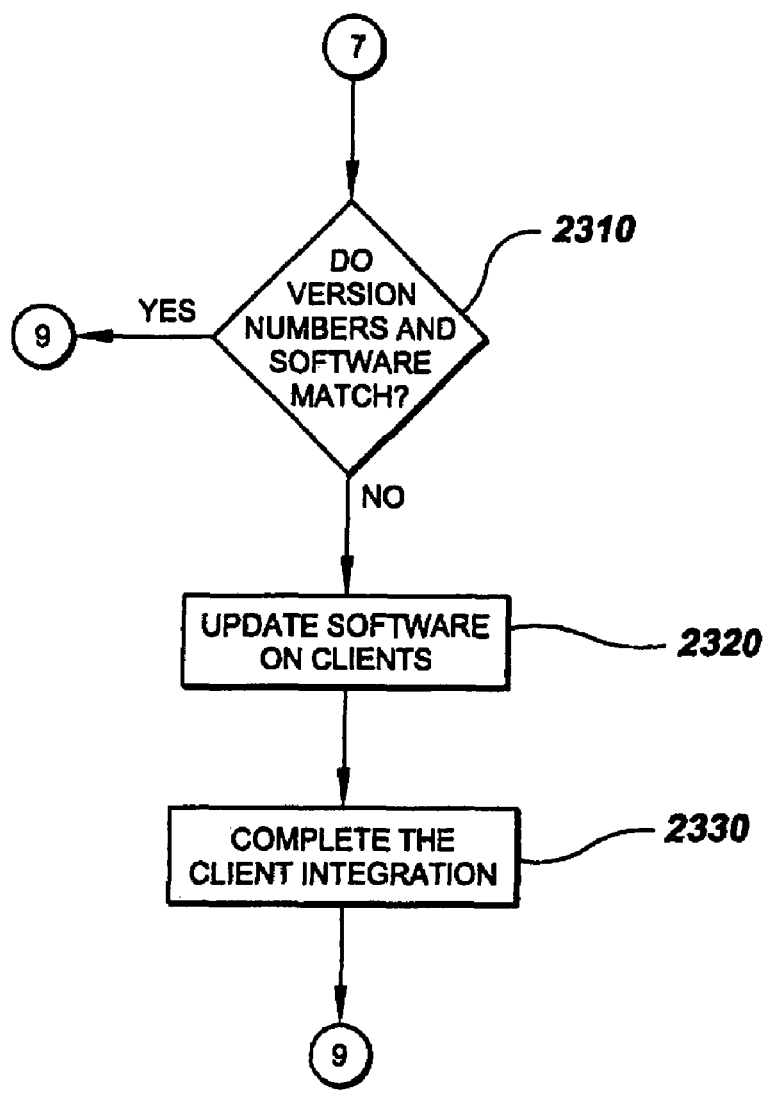

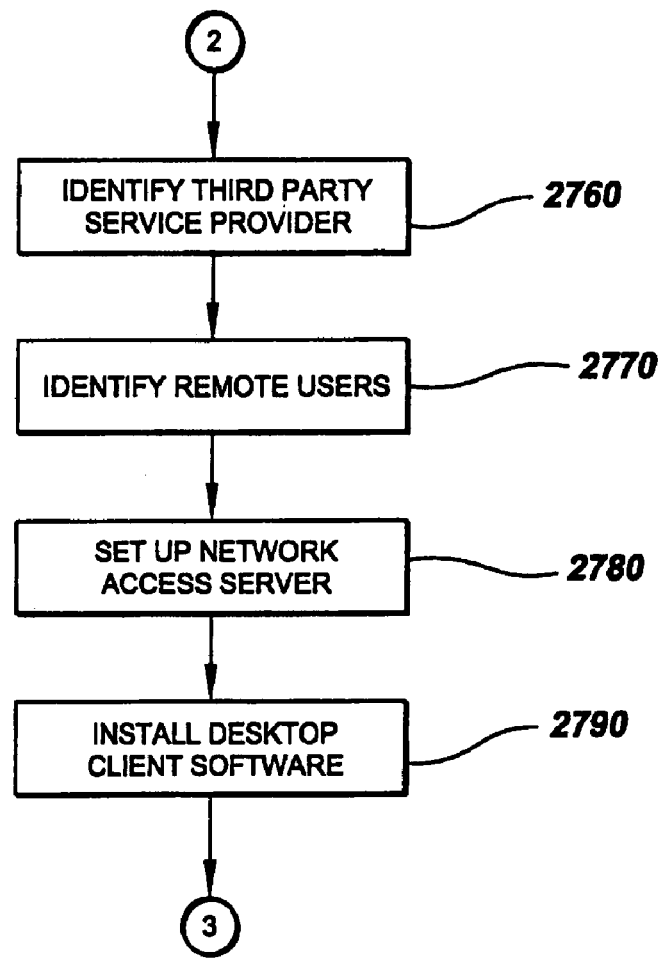

APPARATUS AND METHOD FOR ANALYSIS OF CONVERSATIONAL PATTERNS TO POSITION INFORMATION AND AUTONOMIC ACCESS CONTROL LIST MANAGEMENT

BACKGROUND OF INVENTION

The present invention relates to a computer implemented method for controlling communication between networks and among a plurality of users, specifically, sharing of documents while controlling and updating access in database repository systems.

In current knowledge repositories, access control lists need to be built and updated manually. This is a time consuming task, especially as this requires knowledge regarding a number of individuals, their tasks, responsibilities, and need for access to database repositories.

Generally, in order to make information available to a widely dispersed public, the proprietor of the information will need to submit the information to a central repository. Work groups are common in the corporate environment, and the sharing of group information is a successful component of the work group dynamic. Work group documents may contain any combination of text, numbers, computer program source code, computer hardware schematics or layouts, database records, database references, digitized audio, digitized video, digitized visual images, or other digital information. The availability of this information is dependent somewhat upon the availability of the repository and the awareness of other people having access to the repository. Secrecy controls, when applicable, attempt to allow members of the work group to review and edit the documents while preventing such access by others outside the group.

Access control lists have been introduced to enhance security control measures. A system administrator assigns system users to one or more groups, and an access list that matches groups with access rights is associated with documents in the computer system. However, although access control has been previously defined, determining access control continues to be manually performed by the originator, with little knowledge of the many people and teams that may have a need for the protected information. An automated method of analyzing conversational patterns between people and teams in order to locate inconsistencies in the access level to knowledge repositories and dynamically update access control lists of the knowledge repositories is not currently available in the art.

In U.S. Pat. No. 6,212,534 issued to Lo, et al., on Apr. 3, 2001, entitled, "SYSTEM AND METHOD FOR FACILITATING COLLABORATION IN CONNECTION WITH GENERATING DOCUMENTS AMONG A PLURALITY OF OPERATORS USING NETWORKED COMPUTER SYSTEMS," document information relating to documents being generated is stored along with a user module; the document information including both document structure and document content. The user module includes a whiteboard display module to display a whiteboard to a user, selectively displaying document structure and content. Notecards are assigned to associate documents in a hierarchical organization, and stored separately from each other. Each notecard represents and effectively contains a content item, which may be used in a document. Lo describes the content and structure of documents on which information is stored in a controlled database. The structure, however, describes the document itself, and does not involve comments made while sharing the originated document, nor does it describe the tracking path of the shared document or file. Lo does disclose controlling access to a file containing information on the structure of a document, but the file from which the request for the information is issued is analogous to a web page as opposed to sharing a file or document and (a) controlling and building the access control list through tracking of the file or document among people, and (b) tracking the path of people with whom the file or document has been shared.

In International Patent No. WO 00/57605 issued to Wallace, and published on Sep. 28, 2000, entitled "DOCUMENT TRANSMISSION SYSTEM," a document transmission system is disclosed consisting of a code generator, a document segment archive, and a document processor in communication with the document segment archive. The code generator provides for a document segment code, the segment code being uniquely associated with at least one document segment. The document segment archive includes segment records associated with predefined document segments, each segment including a code identifier associated with one of the predefined document segments. The document processor derives the target document from the segment codes provided from the code generator. Wallace describes a system to share a document by sending a combination of references to parts of the document, which are stored in a central repository. The document is put together at the location of the receiving party. However, Wallace does not handle access control or tracking of the information.

Bearing in mind the problems and deficiencies of the prior art, it is therefore an object of the present invention to provide an apparatus and method for analyzing conversational patterns between people and teams in order to more accurately assign access control of a shared document.

It is another object of the present invention to provide an apparatus and method for locating inconsistencies in the access level to knowledge repositories.

A further object of the invention is to provide an apparatus and method to dynamically update access control lists of knowledge repositories.

It is yet another object of the invention to provide an apparatus and method for prompting an originator or user to facilitate control of the access control lists.

Still other objects and advantages of the invention will in part be obvious and will in part be apparent from the specification.

SUMMARY OF INVENTION

The above and other objects and advantages, which will be apparent to one of skill in the art, are achieved in the present invention, which is directed to, in a first aspect, a method of analyzing conversational patterns to position information sources and autonomic access control list management comprising: calculating the conversational frequency patterns for a selected user from data stored in a first database; calculating access of systems, applications, or documents by the selected user; finding other users from a second database; obtaining a list of systems, applications, or documents utilized by the other users but not by the selected user; and granting or withdrawing access to the selected user. The conversational patterns include at least one record of contact between the selected user and at least one other person.

The step of calculating conversational frequency patterns comprises: obtaining a list of sources from the first database;

identifying individuals for analysis from sources found in the first database; finding existing links among the identified individuals; calculating frequency of contacts; and storing the frequency of contacts in a second database.

The step of calculating system, application, or document access comprises: obtaining a list of systems, applications, or documents from a third database; obtaining access control lists from the list of systems, applications, or documents; calculating frequency of access to the systems, applications, or documents; and storing the frequency of access in a fourth database. The method further comprises building the list of systems, applications, or documents that only includes systems, applications, or documents that are in use by a contact organizational team or contact persons of the selected user. Additionally, the method includes obtaining access control lists from systems, repositories, or online documents.

The method may further comprise: matching conversational partners with system users; building a first structure identifying people with whom the selected user has documented conversations; building a second structure identifying people within the selected user's group of the conversational partners who regularly access the systems, applications, or documents; identifying similarities between the first and second structures; identifying subsets not employed by the selected user, but matching frequently used systems, applications, or documents of the selected user's conversational partners; and prioritizing the subsets and presenting the subsets to the selected user.

Moreover, the method includes building a list of systems, applications, or documents regularly accessed by conversational partners of persons who received a file or document located on one of the systems; and searching the system indices for the file or document in repositories.

Conversational patterns may also be tracked through instant-messaging, emails, or telephonic communications and searching the patterns by keywords.

Other users may be prompted if the selected user gains access to the systems, applications, or documents, and inquiring of the selected user if the access is desired, or granting access to the selected user and opening the system, application, or document.

Deploying process software for analysis of conversational patterns to position information and autonomic access control list management, comprises: installing the process software on at least one server; identifying server addresses for users accessing the process software on the at least one server; installing a proxy server if needed; sending the process software to the at least one server via a file transfer protocol, or sending a transaction to the at least one server containing the process software and receiving and copying the process software to the at least one server's file system; accessing the process software on a user's client computer file system; and executing the process software by the users.

The step of installing the process software further comprises: determining if programs will reside on the at least one server when the process software is executed; identifying the at least one server that will execute the process software; and transferring the process software to the at least one server's storage.

The step of accessing the process software includes having the at least one server automatically copying the process software to each client computer, running an installation program at each client computer, and executing the installation program on the client computer.

Integrating process software for analysis of conversational patterns to position information and autonomic access control list management, comprises: determining if the process software will execute on at least one server; identifying the at least one server address, including checking the at least one server for operating systems, applications, network operating systems, or version numbers for validation with the process software, and identifying any missing software applications that are required for integration; updating the operating systems, the applications, or the network operating systems that are not validated for the process software, and providing any of the missing software applications required for the integration; identifying client addresses and checking the client's computers for operating systems, applications, network operating systems, or version numbers for validation with the process software, and identifying any missing software applications that are required for integration; updating the client's computers with the operating systems, the applications, or the network operating systems that are not validated for the process software, and providing any of the missing software applications required for the integration; and installing the process software on the client's computers and the at least one server.

On demand sharing of process software for analysis of conversational patterns to position information and autonomic access control list management, comprises: creating a transaction containing unique customer identification, requested service type, and service parameters; sending the transaction to at least one main server; querying the server's central processing unit capacity for adequate processing of the transaction; and allocating additional central processing unit capacity when additional capacity is needed to process the transaction, and adding the additional central processing unit capacity to the server, or checking environmental capacity for processing the transaction, including network bandwidth, processor memory, or storage, and allocating the environmental capacity as required.

Deploying, accessing, and executing process software for analysis of conversational patterns to position information and autonomic access control list management through a virtual private network includes: determining if the virtual private network is required; checking for remote access of the virtual private network; if the remote access does not exist, identifying a third party provider to provide secure, encrypted connections between a private network and remote users, identifying the remote users, and setting up a network access server for downloading and installing desktop client software for remotely accessing the virtual private network; accessing the process software; transporting the process software to the remote user's desktop; and executing the process software on the remote user's desktop.

In a second aspect, the present invention is directed to a method of analyzing conversational patterns to position information sources and autonomic access control list management comprising: obtaining a list of sources from a first database; identifying individuals for analysis from the sources found in the first database; finding existing links among the identified individuals; calculating frequency of contacts among the identified individuals; storing the frequency of contacts in a second database; obtaining a list of systems, applications, or documents from a third database; obtaining access control lists from the list of systems, applications, or documents; calculating frequency of access to the systems, applications, or documents; storing the frequency of access in a fourth database; obtaining a list of systems, applications, or documents utilized by other users but not by the identified individuals; and granting or withdrawing access to the identified individuals.

The method further comprises: matching conversational partners with the identified individuals; building a first structure identifying people with whom the identified individuals have documented conversations; building a second structure identifying people within the identified individuals' groups of the conversational partners who regularly access the systems, applications, or documents; identifying similarities between the first and second structures; identifying subsets not employed by the identified individuals, but matching frequently used systems, applications, or documents of the identified individuals' conversational partners; and prioritizing the subsets and presenting the subsets to the user.

BRIEF DESCRIPTION OF DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 8A and 8B are flowcharts of the process flow for deployment of the process software.

FIGS. 9A and 9B are flow charts of the process flow for integration of the software for analysis of conversational patterns to position information and autonomic access control list management into a client, server, and network environment.

FIGS. 11A-11C are flow charts for deploying, accessing, and executing the process software through the use of a virtual private network.

DETAILED DESCRIPTION

Figure 1:
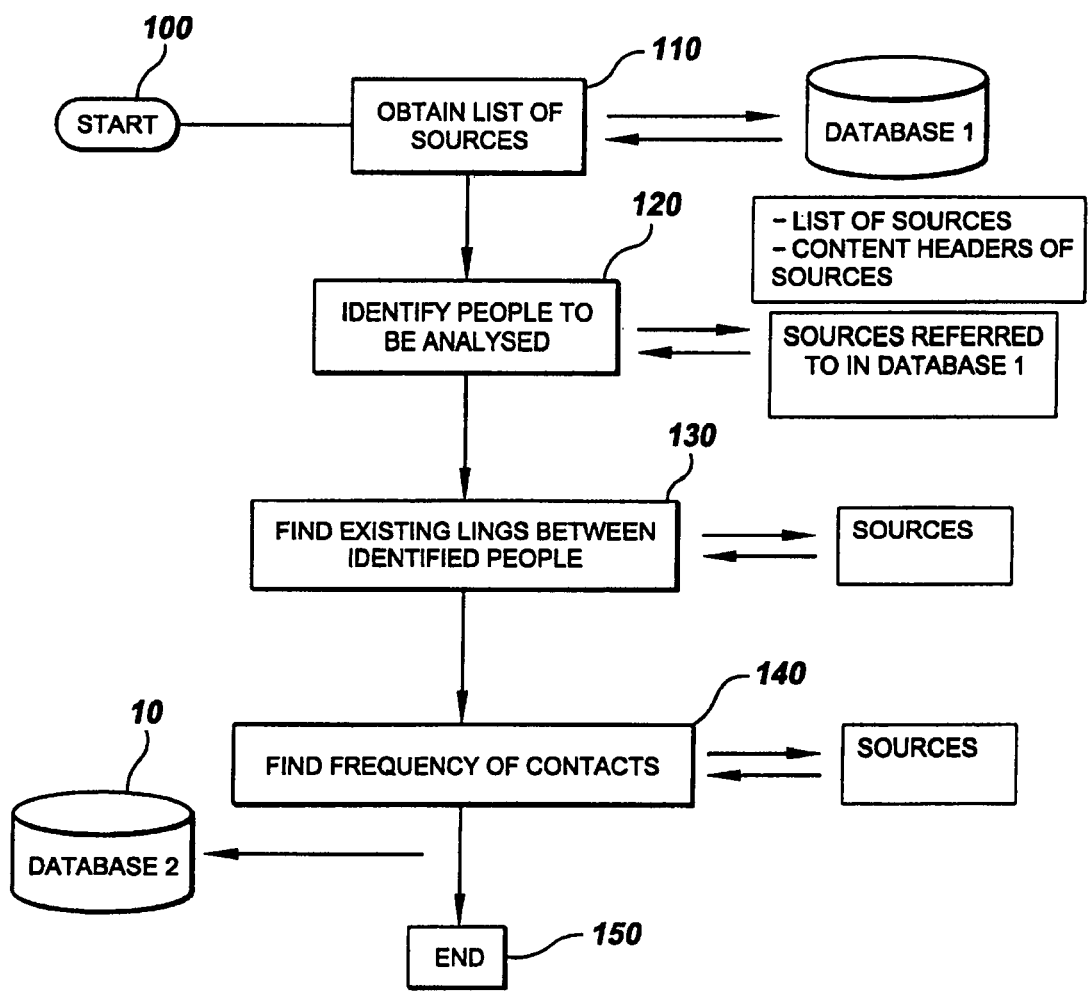
FIG. 1 is a flowchart of a stage of the process flow regarding a list of sources.

In describing the preferred embodiment of the present invention, reference will be made herein to FIGS. 1-11 of the drawings in which like numerals refer to like features of the invention. Features of the invention are not necessarily shown to scale in the drawings.

An apparatus and method employing a software application for operation is proposed for analyzing conversational patterns between people and teams within an organization, locating inconsistencies in the required and actual access level to knowledge repositories, which ultimately results in dynamically updating access control lists of the knowledge repositories, and having the originator and anticipated users being prompted to further enable informed, fact-based manual control of the access control lists.

The process software may be implemented in numerous software languages that are compatible with the system hardware, and is not limited to any one particular software language. Moreover, various hardware schemes may be constructed to implement the application software, such that the process is not limited to a singular, specific hardware configuration.

By way of example, the workings of the instant invention can be summarized using the following application scenario. A first employee, team member 1, is a member of a deployment team with three other individuals, hereinafter referred to respectively as team members 1-4, or TM1-TM4. As TM1 starts to work on the collective team project, he continuously sends instant-messaging messages to TM2 and TM3, discusses issues telephonically with TM2 and TM3, and sends email messages to TM2, TM3, and TM4. An application processing and running on the company's network stores information regarding these different communications, including identifying those being contacted through instant-messaging and email. A second application processing and running on the company's network stores information on the repositories, systems, and online available documents, which are accessed and used by each team member.

In a first instance, TM2 and TM3 are prompted if TM1 should gain access to a repository that is often being used by TM2, TM3, and TM4. This action is initiated when documents that may be found in the repository and shared by one of three team members, TM2-4, are forwarded to TM1. The high frequency of access of this specific combination of persons with whom TM1 actively converses through instant messaging and email initiates the system to prompt the team members already enjoying access. This is important when there has been no prior trace of TM1 accessing the same repository, and TM1 is not on the access control list. Once the monitored relationship between TM1 and the other members has enduring longer, the system then becomes more sensitive such that repositories that are accessed less often become prompted to the other team members. In a second instance, TM1 may be prompted to inquire about gaining access to the repository where most of the document activity has occurred. If he answers in the affirmative he is added to the access control list. In a third instance, if TM1 has not accessed the repositories of his previous team in more than twelve months, he is prompted before being deleted by the access control list of these repositories. If he answers yes, the system prompts him with reasons for its actions regarding deletion from the access control list.

The above-described scenario is applicable to systems and repositories, as well as individual, on-line available documents.

Figure 5:
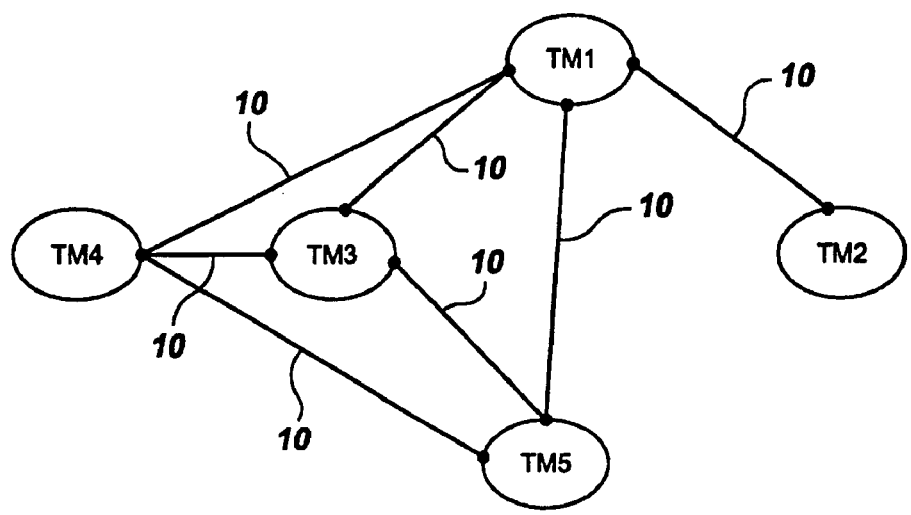
FIG. 5 illustrates a conversational pattern between and among a group of people.
Figure 6:
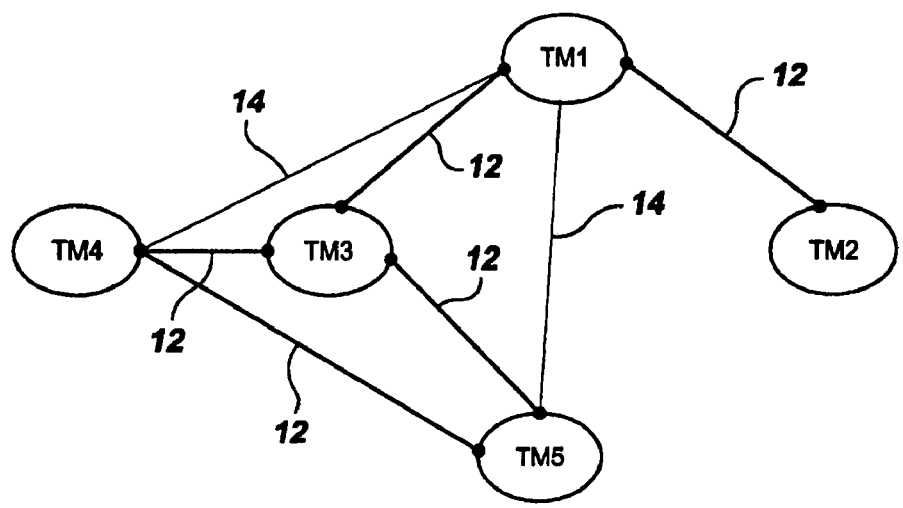
FIG. 6 illustrates the different frequencies of conversational activity between and among the conversational patterns of FIG. 5.

FIGS. 1-4 depict the application flow for the present invention. Referring to FIG. 1, the process commences 100 when the system is loaded. Database 1 is then opened. This database includes information regarding what is available from various sources, including, but not limited to, names and telephone numbers, or other individualized information. A list of sources is obtained 110 from Database 1. The list supplies the specific of information sought for and required. For example, sources that link telephone numbers to names may be obtained, or alternatively all of the existing sources available for a complete system check may be obtained. The process software identifies those individuals to be analyzed 120. For focusing purposes, one may choose to work with people that are listed in a person's address book or chat list. One may also choose for people that are listed on an organizational chart. The existence of conversational patterns is checked and analyzed 130 between identified people within selected sources. A conversational pattern exists when there is a record of contact between two people, such as a telephone conversation that is found on a list of outgoing telephone calls. FIG. 5 illustrates the existence of some form of conversation between persons or team members TM1-TM5. Lines 10 drawn between persons TM1-TM5 represent contact between the individuals. This analysis is used to enable automated, targeted study of conversational patterns. Referring back to FIG. 1, for these existing contacts or conversation patterns, the frequency upon which they occur are monitored and stored 140. Again, this information is derived from the selected sources. The results of steps 130 and 140 are written 109 to Database 2, including the existing conversational pattern and the frequency of the selected communications. FIG. 6 depicts the extent of conversation frequency for the persons delineated in FIG. 5. Lines 12 represent the thicker lines, and depict higher frequency contacts, while the thinner lines 14 represent less frequent contact. Once the analysis of conversation is complete, the results are stored in Database 2, ending the first stage of the process software 150.

Figure 2:
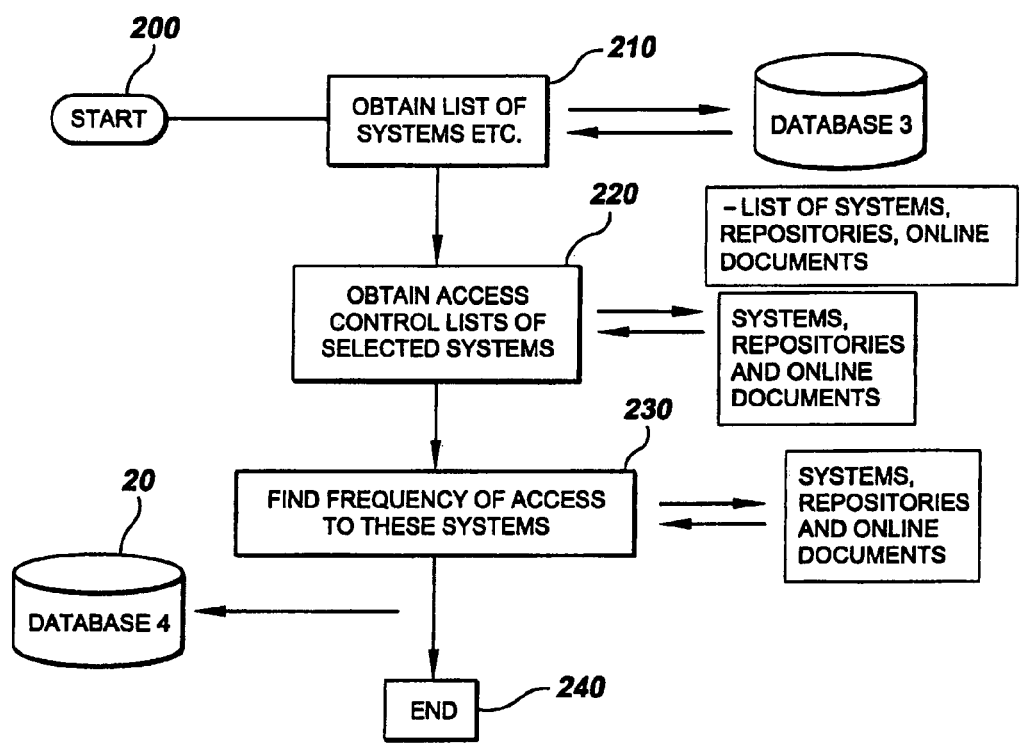
FIG. 2 is a flowchart of a stage of the process flow regarding a list of systems.

FIG. 2 is a flowchart of the second stage of the process flow. The second stage commences 200 by first obtaining a list of systems, repositories, and documents 210 that are available on-line from Database 3. Optionally, a list may be built that only includes systems that are in use by the organizational team or contact persons of the person whose conversational pattern is being analyzed. Next, the access control lists of the selected systems, repositories, and documents are obtained 220. These contain names, user names, or email addresses, and the like, of people and the associate level of access for these individuals. The name of the system, repository, or on-line documents from which this information derives is stored in memory. Once again, optionally, a list may be built that only includes systems, repositories, and on-line documents that are in use by the organizational team or contact persons of the person whose conversational pattern is being analyzed. For the existing users with access to certain systems or other sources, a frequency is established for such access 230. This information is derived from the access control list itself or an available log of users accessing the system, repository, or on-line documents. This information may be made available by the system, repository, or on-line documents themselves, or found on proxy servers used by the persons whose conversational patterns are being analyzed. The results of steps 220 and 230 are written 20 to a Database 4, which includes the system, repositories, and on-line documents, identification of the users having access, and the frequency of each user's access to the systems, repositories, and on-line documents.

Figure 3:
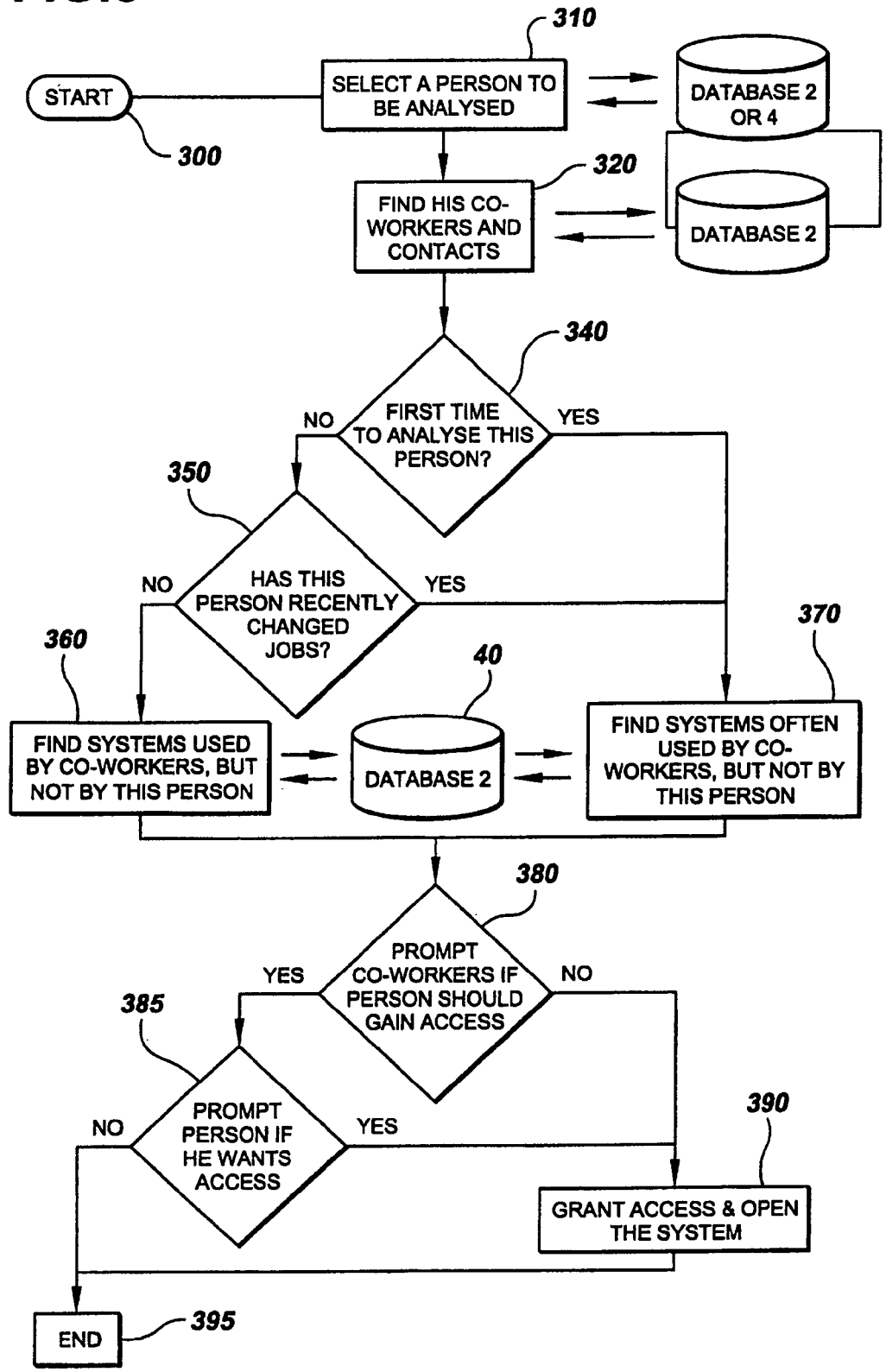
FIG. 3 is a flowchart of a stage of the process flow regarding co-workers and other users or contacts.

FIG. 3 is a flowchart of the third stage of the process flow. Any user may initiate the process flow 300. The individual being analyzed is first selected 310. This person may be the user of the system, repository, or documents, or one of the users of these entities, as selected by someone else. Information regarding the analyzed individual is located in Database 2 or Database 4, which house the conversational patterns built through the process flow described in FIG. 1, and in the database with the listing of systems, repositories, and documents, users having access, and the frequency of these users accessing the systems, repositories, and documents. Co-workers and contacts of the analyzed individual are located 320 in Database 2, and in stored, available organizational charts.

If this is the first time the analyzed individual is being studied 340, the system operation is basic in its search for systems that are used by this person's co-workers, but not by the analyzed individual himself 370. Database 2 is consulted for this search. If it is not the first time the analyzed individual is being studied, the time elapsed when this person may have switched work environments is considered 350. The analyzed individual may have a need to be prompted with systems of which he is not yet aware. If the individual's work environment has not changed recently, the process software continues with a more refined search for systems, repositories, and documents that are used by the analyzed individual's co-workers, but not by the individual himself 360. Since the individual is already experienced in his project, it is likely the systems used most often by his co-workers are systems used by him as well. To ensure this, a basic search as described in step 370 is again conducted, and the results are stored in memory. From the acquired set of systems, repositories, and documents 380, linearly traversing through each one, co-workers are prompted if the analyzed individual gains access 385, and the individual is prompted if he desires access 385, in which case access is granted and the system is opened 390. These process steps (380-390) may be repeated for each system, repository, and document. Along with this request are a description of the system that is derived from the system itself and a demonstration of the system, if available. If the user indicates that he would like access to this database, the access control list is updated and the system is opened, or a link to the system is sent to the user 390. The aforementioned process steps 380 and 385 may be reversed, while achieving the same result.

In a first alternative embodiment, conversational partners may be matched with regular systems users. The process software builds a first structure that identifies people with whom the user has documented conversations. A second structure is built of people within the users group of conversational partners who regularly access the system. Similarities are identified between the two structures. Statistical methodologies may be employed to ensure small deviations are accounted for. Subsets of systems that are not employed by the user, but do match his conversational partners frequently used systems are then prioritized. These systems are presented to the user; emphasized in process step 385.

In a second alternative embodiment, the process software commences when a file is shared between conversational partners of the user to be analyzed. A list is made of systems that are regularly accessed by the conversational partners of the persons who received a file or document that may have been located in one of these systems. A check is then run on the available systems if the file or document is in any of the repositories.

Searching in the systems' indices performs this check. If the document or file is found in one of the systems, process steps 380 and 385 are initiated. Otherwise, this alternative embodiment ends.

Figure 4:
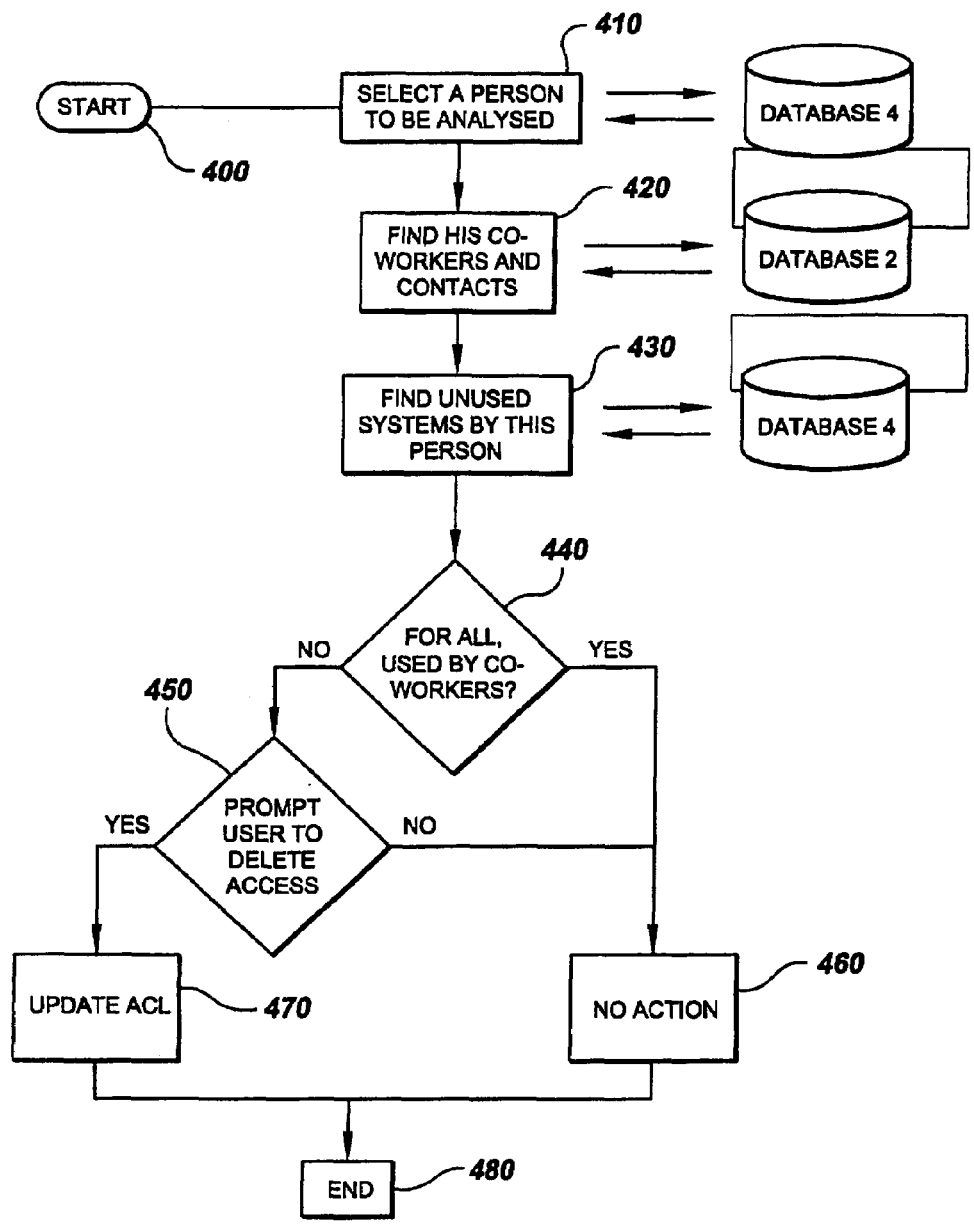
FIG. 4 is a flowchart of the process software for autonomically updating the access control list, optionally controlled by the user.

A process flow for autonomically updating the access control list, optionally controlled by the user, is depicted in FIG. 4. First, a person is selected for analysis 410. When a user initiates this process, the user becomes the default person to be analyzed. Next, the conversational patterns between this analyzed person and his colleagues are studied 420. Systems, applications, or on-line documents to which this person has access are then located 430. Optionally, a predetermined period of elapsed time of access may be assigned, dependent upon user preferences. For each system located, co-worker usage is checked 440. If a co-worker does use a system, his access will not be deleted by default 460; however, the user may be prompted with information regarding the most often used documents within these systems, or most often used functionalities in these applications. If the found system is not used by the user or by his co-workers, the user is prompted to decide if the access should be deleted 450. The access control list is then updated 470. The process steps 440-470 are repeated until all found unused systems and applications have been reviewed.

In another embodiment, in order to be able to analyze documented conversational patterns between people, a system may be used that builds a list of outgoing and incoming telephone calls. This system would reside either on a central server in connection with the telephone router, or at the client system with, for example, a telephone connection that is connected with the modem port of the client computer system. This may also be connected through wireless devices, such as Bluetooth technology. This information may also be derived from telephone billing documents.

Figure 7:
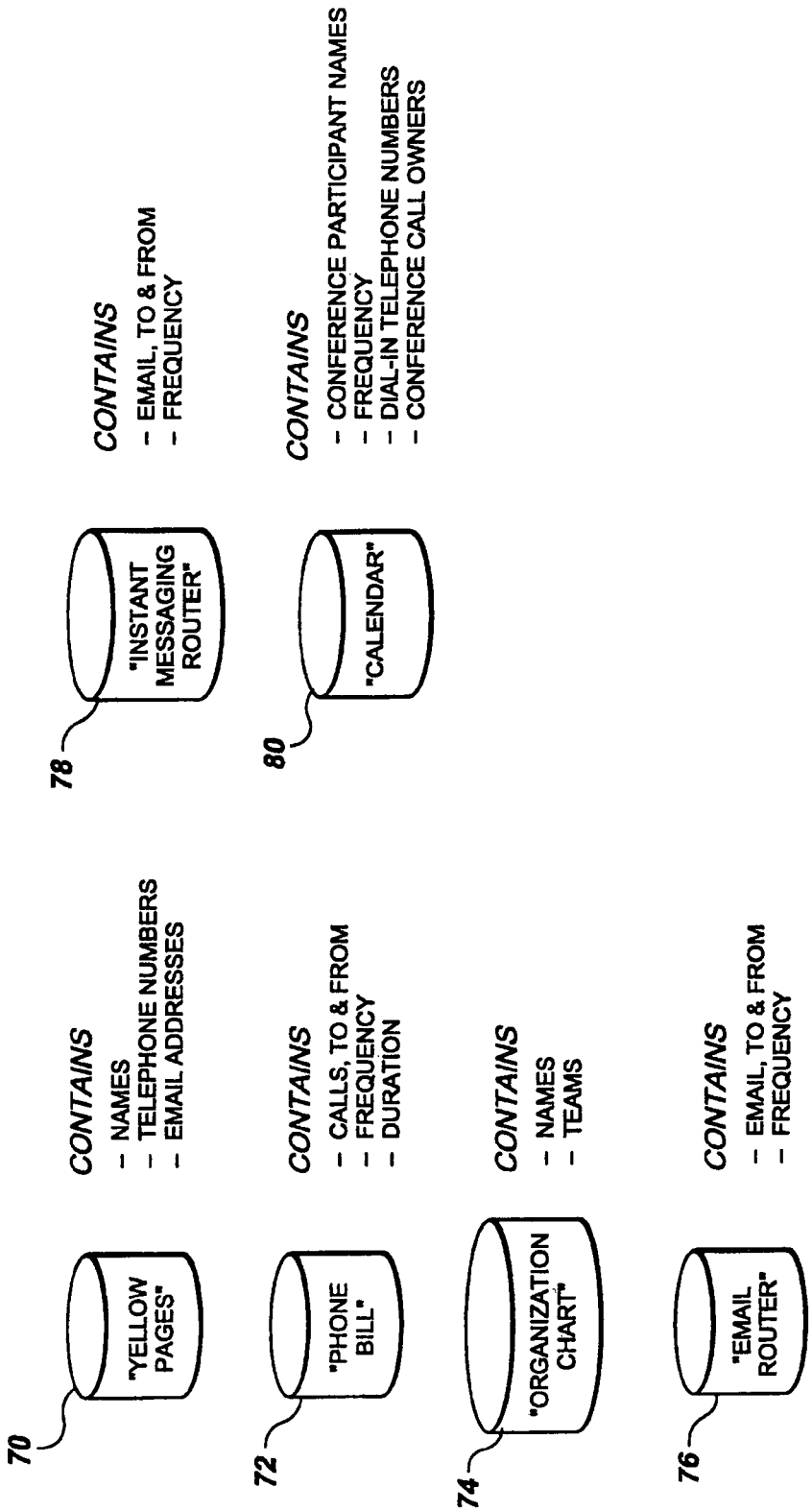
FIG. 7 depicts a list of sources to enable analysis of conversational patterns and frequencies.

Conversations that are tracked through instant-messaging, emails, or telephone calls may be stored and analyzed to enable categorization by keyword. These keywords, found in conversations between people within the analyzed group, are added for verification of the suitability of the presented systems prompted to the user. In addition they may also be used to add content to conversations, instead of only using frequency of contacts as a source to position information to users. Typically, the user is prompted with sources that are not only used by his co-workers, but that also correspond with the categorized content of these conversations that he has with his co-workers. This results in an application that prompts the user more selectively with systems, applications, and documents. FIG. 7 depicts a list of sources to enable analysis of conversational patterns and frequencies. These sources include yellow pages 70, phone bills 72, organizational charts 74, email routers 76, instant-messaging routers 78, and electronic calendars 80. The yellow pages typically include names, telephone numbers, and more currently, email addresses. Phone bills contain calls to and from persons, call frequency, and call duration. Organizational charts typically contain names, titles, and teams or working groups. Email routers and instant-messaging routers generally contain email to and from persons, and frequency of sending and receiving. Electronic calendars contain conference participant names, frequency of meetings, dial-in telephone numbers, and conference-call owners.

Method for Deployment

While it is understood that the process software for analysis of conversational patterns to position information and autonomic access control list management may be deployed by manually loading directly in the client, server, and proxy computers via loading a storage medium such as a CD, DVD, and the like, the process software may also be automatically or semi-automatically deployed into a computer system by sending the process software to a central server or a group of central servers. The process software is then downloaded and executed by client computers. Alternatively, the process software is sent directly to the client system via email. The process software is then either detached to a directory or loaded into a directory by a button associated with the email that executes a program on demand. The executed program detaches the process software into a directory. Another alternative is to send the process software directly to a directory on the client computer hard drive. When there are proxy servers, the process software will select the proxy server code, determine which computers to place the proxy servers' code, transmit the proxy server code, and install the proxy server code on the proxy computer. The process software is then transmitted to the proxy server and stored therein.

Figure 8A:
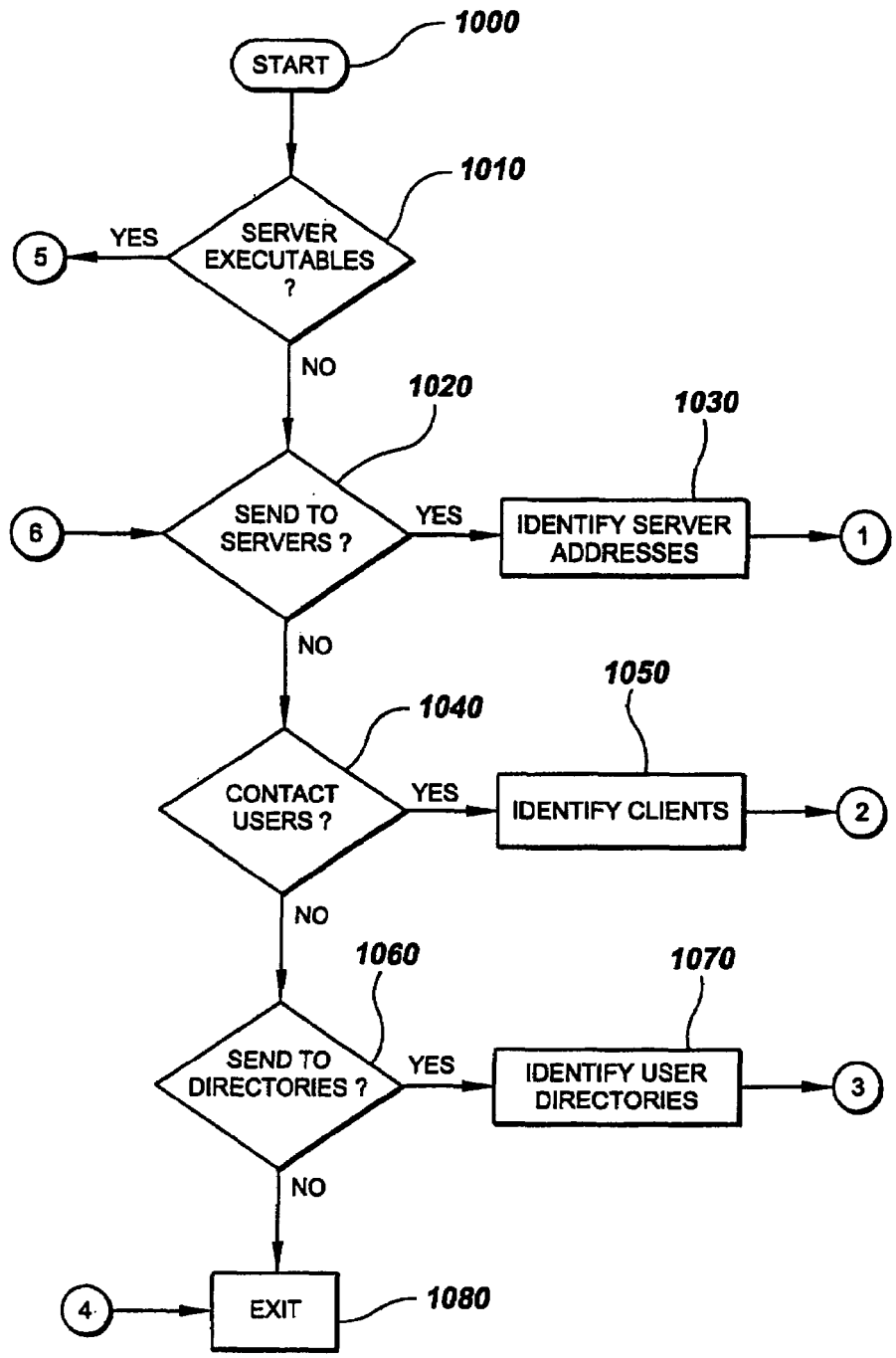

FIGS. 8A and 8B detail the process flow for deployment of the process software. Referring to FIGS. 8A and 8B, Step 1000 begins the deployment. First, a determination is made regarding any programs that will reside on a server or servers when the process software is executed 1010. If such programs exist, the servers that will contain the executables are identified 2090. The process software for the server or servers is transferred directly to the servers' storage via an established protocol, such as file transfer protocol (FTP), and the like, or by copying through the use of a shared file system 2100. The process software is then installed on the servers 2110.

Next, a determination is made on whether the process software is be deployed by having users access the process software on a server or servers 1020. If the users are to access the process software on servers, server addresses are identified 1030 to store the process software.

It is then determined if it is necessary to build a proxy server 2000 to store the process software. A proxy server is a server that sits between a client application, such as a Web browser, and a real server. It intercepts all requests to the real server in an attempt to fulfill the requests itself. If it is not possible for the proxy server to fulfill the requests, then the proxy server will forward the request to the real server. The two primary benefits of a proxy server are to improve performance and to filter requests. If a proxy server is necessitated, then it is installed 2010. The process software is sent to the servers either via an established protocol, such as FTP, and the like, or it is copied directly from the source files to the server files via file sharing 2020.

In another embodiment, a transaction is sent to servers that contain the process software. The servers then process the transaction, and receive and copy the process software to the servers' file systems. Once the process software is stored at the servers, the users via their client computers access the process software on the servers and copy to their client computers file systems 2030. In a separate embodiment, the servers automatically copy the process software to each client and then run the installation program for the process software at each client computer. The user executes the program that installs the process software on his client computer 2120, and exits the process 1080.

In step 1040 determination is made whether the process software is deployed by sending the process software to users via e-mail. The set of users where the process software will be deployed are identified together with the addresses of the users' client computers 1050. The process software is sent via e-mail to each of the users' client computers. The users then receive the e-mail 2050 and detach the process software from the e-mail to a directory on their client computers 2060. Each user executes the program that installs the process software on his client computer 2120 and exits the process 1080.

Last, a determination is made as to whether the process software will be sent directly to users' directories on their client computers 1060. If it is sent, the user directories are identified 1070. The process software is transferred directly to each user's client computer directory 2070. This can be done in several ways, such as sharing of the file system directories and then copying from the sender's file system to the recipient user's file system, or alternatively using a transfer protocol such as FTP, and the like. The users access the directories on their client file systems in preparation for installing the process software 2080. The users execute the program that installs the process software on their client computer 2120, then exit the process 1080.

Method for Integration The process software for analysis of conversational patterns to position information and autonomic access control list management may be integrated into a client, server, and network environment by providing for the process software to coexist with applications, operating systems, or network operating systems software, and installing the process software on the clients and servers in an environment where the process software will function.

Initially, one must identify any software on the clients and servers, including the network operating system, where the process software will be deployed, that is required by the process software or that work in conjunction with the process software. This includes the network operating system or other software that enhances a basic operating system by adding networking features.

The software applications and version numbers are then identified and compared to a list of software applications validated to work with the process software. Those software applications that have not been validated for integration are subsequently upgraded. Program instructions that pass parameters from the process software to the software applications are checked to ensure the parameter lists match the parameter lists required by the process software. Conversely parameters passed from the software applications to the process software are checked to ensure the parameters match the parameters required by the process software. The client and server operating systems including the network operating systems are identified and compared to a list of operating systems, version numbers, or network software, all previously tested to work with the process software. Those operating systems, version numbers, and network software that do not match the list of tested operating systems and version numbers are subsequently upgraded to the required level on the clients and servers.

After ensuring that the software locale where the process software is to be deployed is at the correct version level validated to work with the process software, the integration is then completed by installing the process software on the clients and servers.

Figure 9A:
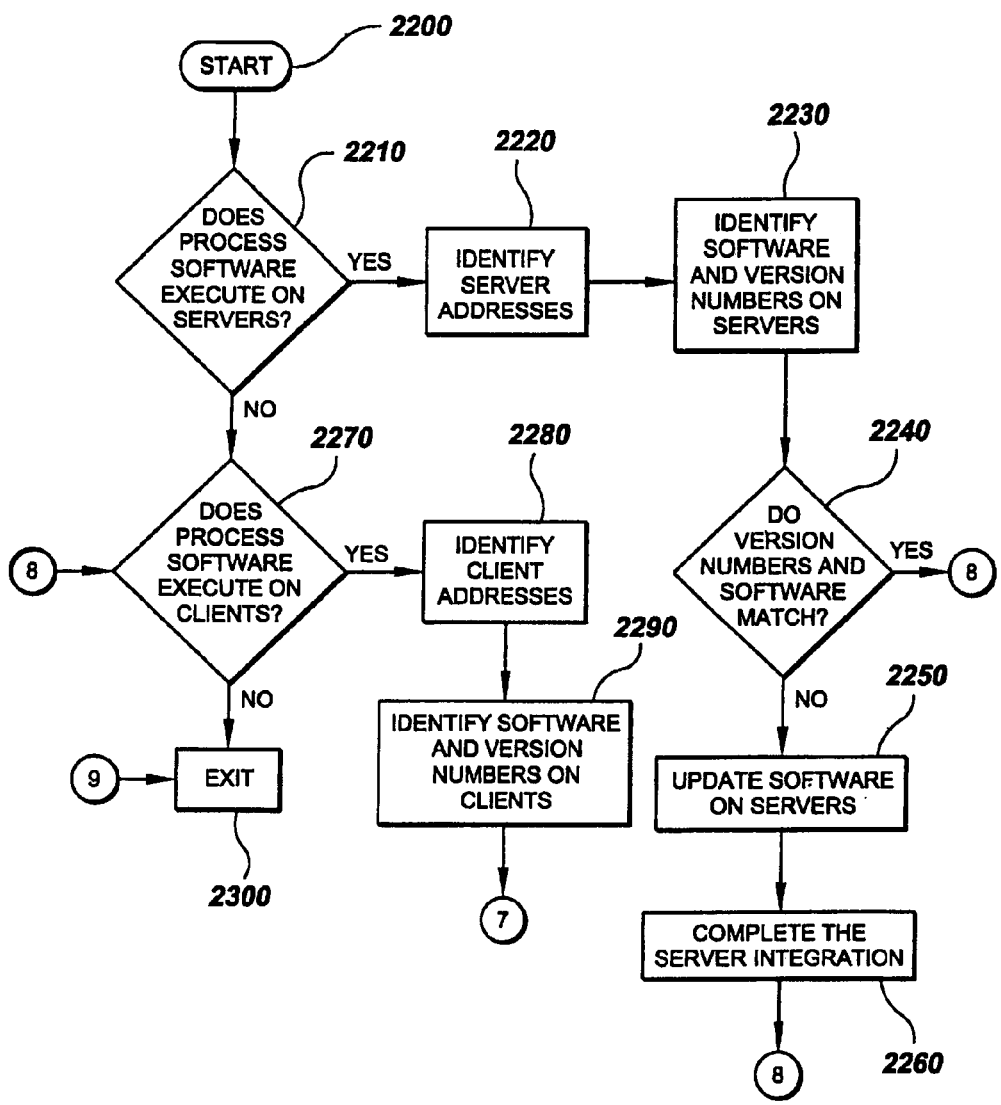

Referring to FIGS. 9A and 9B, step 2200 begins the integration of the process software. Initially, a determination is made regarding process software programs that will execute on a server or servers 2210. If this is the case, the server addresses are identified 2220. The servers are checked to see if they contain software that includes the operating system applications, or network operating systems (NOS), together with their version numbers, that have been validated with the process software 2230. The servers are also checked to determine if there is any missing software that is required by the process software 2230.

The version numbers are checked for a match to the version numbers of the operating system, applications, or network operating systems, validated with the process software 2240. If all of the versions match and there is no required software absent, the integration continues 2270. If one or more of the version numbers do not match, then the unmatched software versions are updated on the servers with the correct software versions 2250. Additionally, any missing software required for operation is updated on the servers 2250. Installing the process software 2260 completes the server integration.

A process step is initiated to see if there are any programs of the process software that will execute on the clients 2270. If no process software programs execute on the clients, the integration exits 2300. If software executes on the clients, the client addresses are identified 2280. The clients are checked for software that includes the operating system, applications, or network operating systems, together with their version numbers, validated with the process software 2290. The clients are also checked to determine if there is any missing software that is required by the process software 2290.

A determination is made as to whether the version numbers match the version numbers of the operating system, the applications, or network operating systems, validated with the process software 2310. If all of the versions match and there is no required software absent, the integration exits.

If one or more of the version numbers do not match, then the unmatched versions are updated on the clients with the correct versions 2320. In addition, if there is required software missing, it is also updated on the clients 2320. Installing the process software on the clients 2330 completes the integration.

On Demand Computing

Business importance of On Demand computing is increasingly becoming a desired attribute. The process software of the present invention for analysis of conversational patterns to position information and autonomic access control list management, is shared; simultaneously serving multiple customers in a flexible, automated fashion. It is standardized, requiring little customization, and is scalable, providing capacity on demand in a pay-as-you-go model.

The process software can be stored on a shared file system accessible from one or more servers. The process software is executed via transactions that contain data and server processing requests using CPU units on the accessed server. CPU units are units of time such as minutes, seconds, and hours on the central processor of the server. Additionally the assessed server may make requests of other servers that require CPU units. CPU units are an example that represents but one measurement of use. Other measurements of use include, but are not limited to, network bandwidth, memory usage, storage usage, packet transfers, and complete transactions.

When multiple customers use the same process software application, their transactions are differentiated by the parameters included in the transactions identifying a unique customer and the type of service for that customer. All of the CPU units and other measurements of use that are used for the services for each customer are recorded. When the number of transactions to any one server begins to affect the performance of that server, other servers are accessed to increase capacity and share the workload. Likewise when other measurements of use such as network bandwidth, memory usage, and storage usage, approach a capacity that affects performance, additional network bandwidth, memory usage, or storage, is added to share the workload.

The measurements of use for each service and customer are sent to a collecting server that sums the measurements of use for each customer. This is performed for each service that was processed anywhere in the network of servers that provides the shared execution of the process software. The summed measurements of use units are periodically multiplied by unit costs, and the resulting total process software application service costs are alternatively sent to the customer or indicated on a web site accessed by the customer, which then remits payment to the service provider.

In another embodiment, the service provider requests payment directly from a customer account at a banking or financial institution.

In yet another embodiment, if the service provider is also a customer of the customer that uses the process software application, the payment owed to the service provider is reconciled to the payment owed by the service provider to minimize the transfer of payments.

Figure 10A:
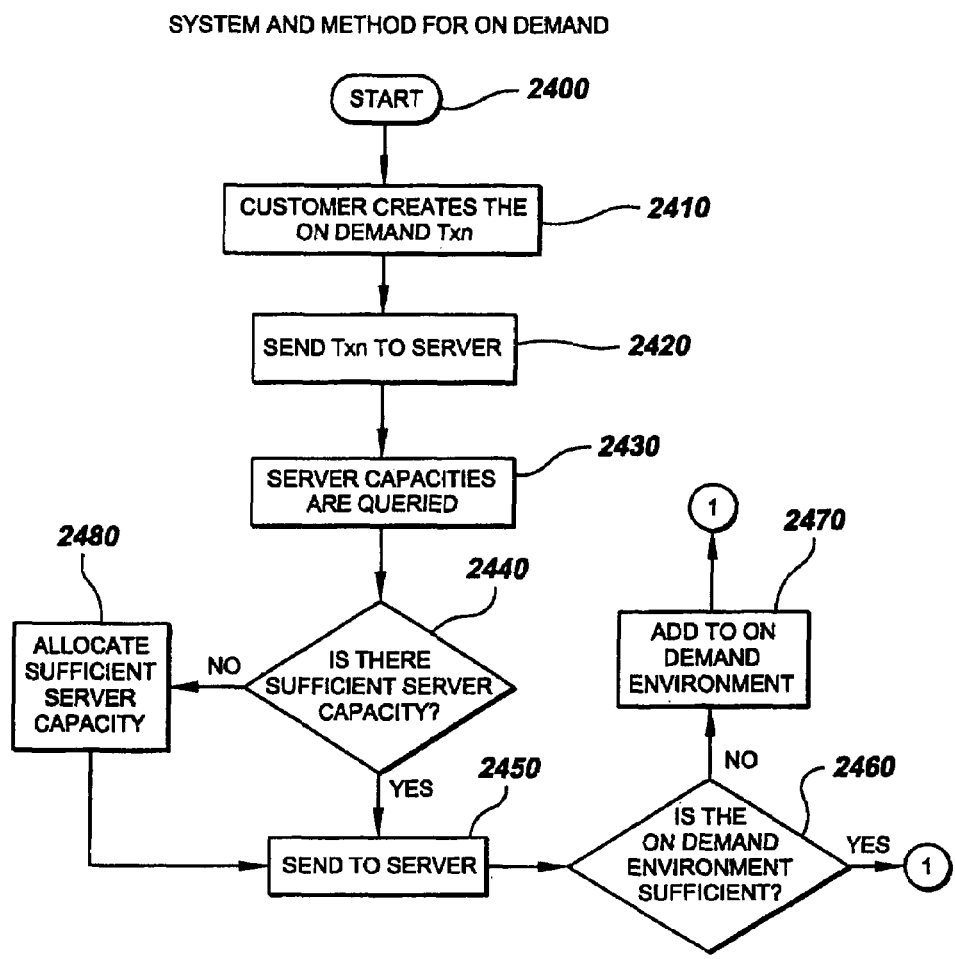
FIGS. 10A and 10B are flow charts of the process flow for sharing and simultaneously serving the process software of the present invention to multiple customers in an on demand format.
Figure 10B:
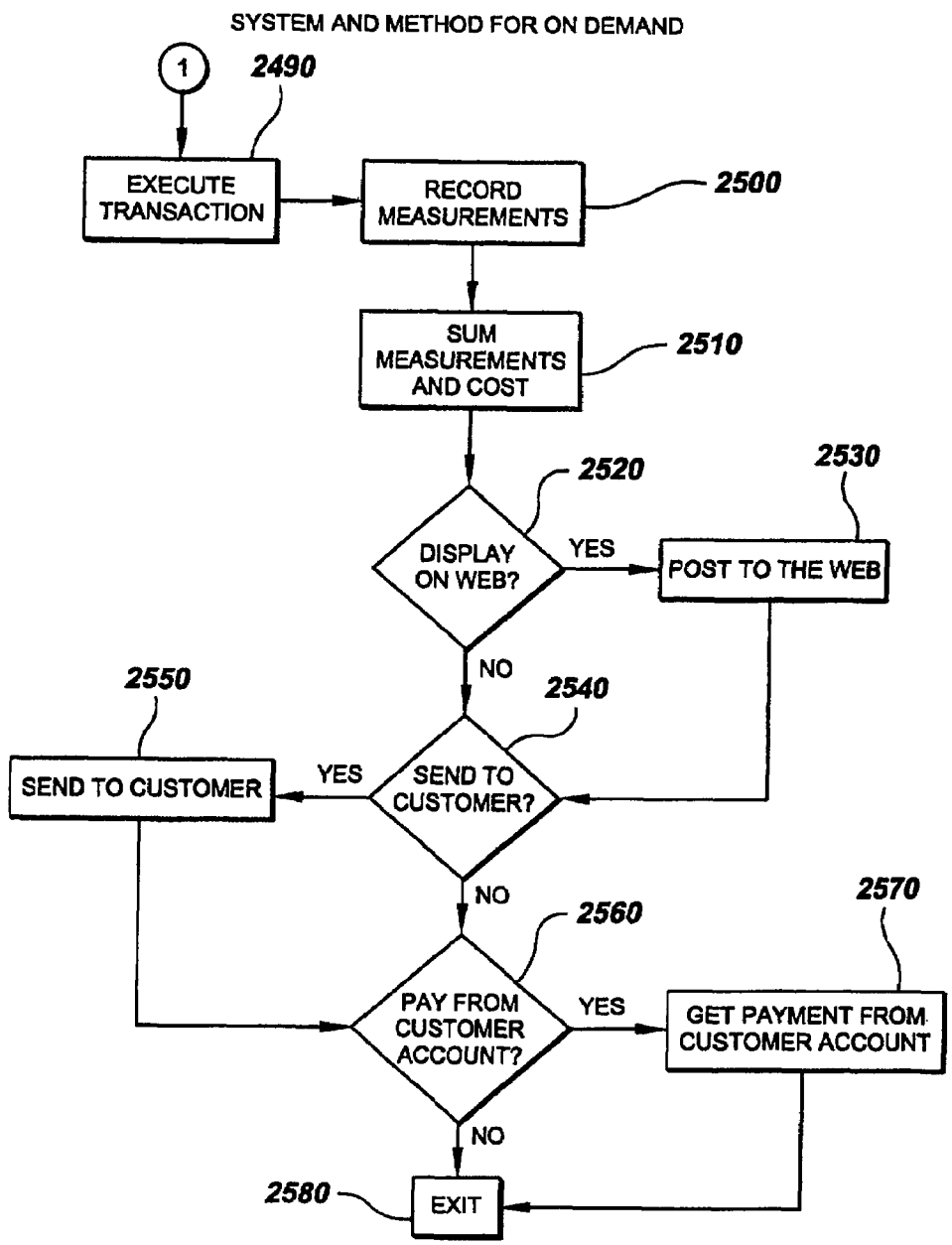

Referring to FIGS. 10A and 10B, the On Demand process commences at step 2400. A transaction is created containing the unique customer identification, the requested service type, and any service parameters that further specify the type of service 2410. The transaction is then sent to the main server 2420. In an On Demand environment, the main server can initially be the sole server, and then as capacity is consumed, other servers may be added. The server central processing unit (CPU) capacities in the On Demand environment are queried 2430. The CPU requirement of the transaction is estimated, and the servers' available CPU capacity is compared to the transaction CPU requirement to see if there is sufficient capacity in any server to process the transaction 2440. If there is not sufficient server CPU available capacity, then additional capacity is allocated to process the transaction 2480. If there is already sufficient CPU capacity available, the transaction is sent to a selected server 2450.

Before executing the transaction, a check is made of the remaining On Demand environment to determine if the environment has sufficient available capacity for processing the transaction. This environment capacity consists of such things as network bandwidth, processor memory, storage, and the like 2460. If there is not sufficient available capacity, capacity is added to the On Demand environment 2470. The required software to process the transaction is then accessed and loaded into memory. The transaction is then executed 2490.

The usage measurements are recorded 2500. The usage measurements consist of the portions of those functions in the On Demand environment that is used to process the transaction. The usage of such functions as network bandwidth, processor memory, storage and CPU cycles are recorded. The usage measurements are summed, multiplied by unit costs, and recorded as a charge to the requesting customer 2510.

On Demand costs may be posted to a web site 2530 if the customer has so requested. Or the customer may request 2540 that the On Demand costs be sent via e-mail to a customer address 2550. If the customer has requested that the On Demand costs be paid directly from a customer account 2560, then payment is received accordingly 2570.

Virtual Private Networks

The process software for analysis of conversational patterns to position information and autonomic access control list management may be deployed, accessed, and executed through the use of a virtual private network (VPN), which is any combination of technologies that can be used to secure a connection through an otherwise unsecured or untrusted network. The use of VPNs is to improve security and to reduce operational costs. The VPN makes use of a public network, usually the Internet, to connect remote sites or users together. Instead of using a dedicated, real-world connection such as leased line, the VPN uses "virtual" connections routed through the Internet from the company's private network to a remote site. Access to the software via a VPN can be provided as a service by specifically constructing the VPN for purposes of delivery or execution of the process software, for example when the software resides elsewhere. The lifetime of the VPN may be limited to a given period of time or a given number of deployments based on an amount paid.

The process software may be deployed, accessed and executed through either a remote-access or a site-to-site VPN. When using remote-access VPNs the process software is deployed, accessed and executed via the secure, encrypted connections between a company's private network and remote users through a third-party service provider. The enterprise service provider (ESP) sets a network access server (NAS) and provides remote users with desktop client software for their computers. The telecommuters are then able to dial a toll-free number or attach directly via a cable or digital subscriber line (DSL) modem in order to reach the NAS and use their VPN client software to access the corporate network and to access, download, and execute the process software.

When using the site-to-site VPN, the process software is deployed, accessed, and executed through the use of dedicated equipment and large-scale encryption that may be used to connect a company's multiple fixed sites over a public network such as the Internet.

The process software is transported over the VPN via tunneling which is the process of placing an entire packet within another packet and sending it over a network. The protocol of the outer packet is understood by the network and interface points, called tunnel interfaces, where the packet enters and exits the network.

Figure 11A:
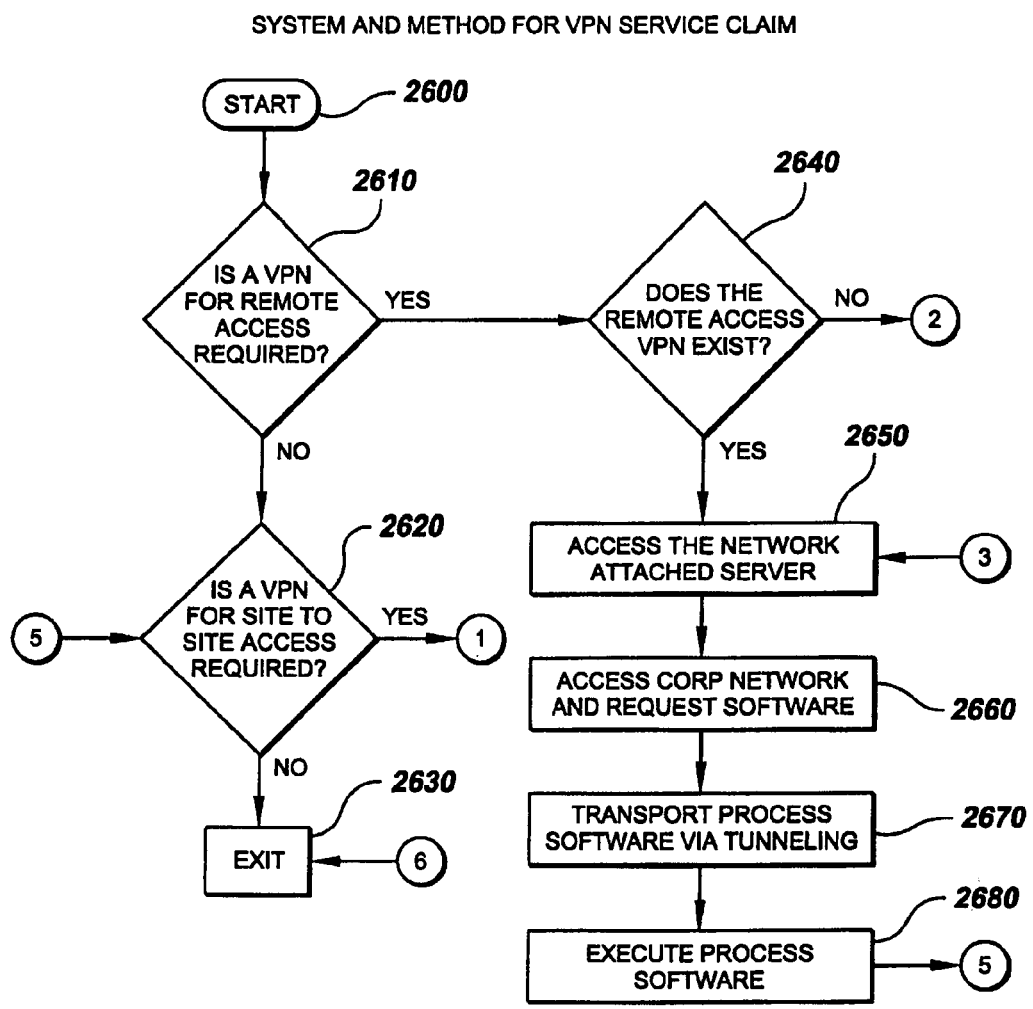
Figure 11B:
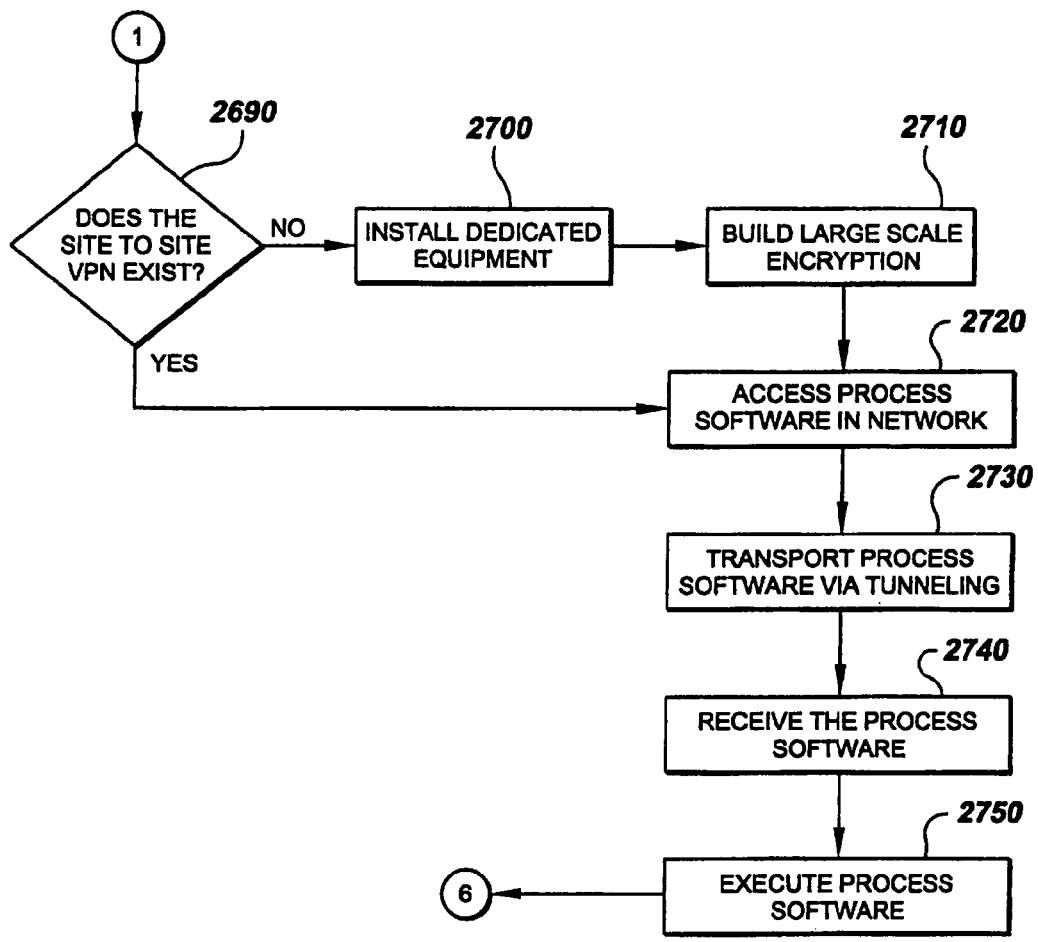

Referring to FIGS. 11A-11C, step 2600 begins the Virtual Private Network (VPN) process. A determination is made to see if a VPN for remote access is required 2610. If required, the system checks to see if a remote access VPN exists 2640. If one does not exist, a third party provider is identified that will provide the secure, encrypted connections between the company's private network and the company's remote users 2760. The company's remote users are identified 2770. The third party provider then sets up a network access server (NAS) 2780 that allows the remote users to dial a toll free number or attach directly via a cable or DSL modem to access, download, and install the desktop client software for the remote-access VPN 2790.

After the remote access VPN has been built or if previously installed, the remote users may access the process software by dialing into the NAS or attaching directly via a cable or DSL modem into the NAS 2650. This allows entry into the corporate network where the process software is accessed 2660. The process software is transported to the remote user's desktop over the network via tunneling. The process software is divided into packets and each packet including the data and protocol is placed within another packet 2670. When the process software arrives at the remote user's desktop, it is removed from the packets, reconstituted and executed on the remote users desktop 2680.

When a VPN for remote access is not required, a determination is made to see if a VPN for site-to-site access is required 2620. If it is not required, the process exits 2630. Otherwise, determination of the site-to-site VPN is made 2690. If the site to site VPN does not exist, dedicated equipment required to establish a site to site VPN must be installed 2700. Large-scale encryption is then built into the VPN 2710. After the site-to-site VPN has been built or if it had been previously established, the users access the process software via the VPN 2720. The process software is transported to the site users over the network via tunneling. That is the process software is received by being divided into packets, each packet including the data and protocol placed within another packet 2740. When the process software arrives at the remote user's desktop, it is removed from the packets, reconstituted, and executed on the site users desktop 2750.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of analyzing conversational patterns to position information sources and autonomic access control list management comprising:
   calculating said conversational frequency patterns for a selected user from data stored in a first database;
   calculating access of systems, applications, or documents by said selected user, including:
      obtaining a list of systems, applications, or documents from a third database;
      obtaining access control lists from said list of systems, applications, or documents;
      calculating frequency of access to said systems, applications, or documents; and
      storing said frequency of access in a fourth database;
   finding other users from a second database;
   obtaining a list of systems, applications, or documents utilized by said other users but not by said selected user; and
   granting or withdrawing access to said selected user.

2. The method of claim 1 wherein said conversational patterns include at least one record of contact between said selected user and at least one other person.

3. The method of claim 1 wherein said step of calculating conversational frequency patterns comprises:
   obtaining a list of sources from said first database;
   identifying individuals for analysis from sources found in said first database;
   finding existing links among said identified individuals;
   calculating frequency of contacts; and
   storing said frequency of contacts in a second database.

4. The method of claim 1 further comprising building said list of systems, applications, or documents that only includes systems, applications, or documents that are in use by a contact organizational team or contact persons of said selected user.

5. The method of claim 1 further comprising obtaining access control lists from systems, repositories, or online documents.

6. The method of claim 1 further comprising:
   building a list of systems, applications, or documents regularly accessed by conversational partners of persons who received a file or document located on one of said systems; and
   searching said system indices for said file or document in repositories.

7. The method of claim 1 further comprising tracking said conversational patterns through instant-messaging, emails, or telephonic communications and searching said patterns by keywords.

8. The method of claim 1 further comprising prompting said other users if said selected user gains access to said systems, applications, or documents, and inquiring of said selected user if said access is desired, or granting access to said selected user and opening said system, application, or document.

9. A method of analyzing conversational patterns to position information sources and autonomic access control list management comprising:
   calculating said conversational frequency patterns for a selected user from data stored in a first database;
   calculating access of systems, applications, or documents by said selected user;
   finding other users from a second database;
   matching conversational partners with system users;
   building a first structure identifying people with whom said selected user has documented conversations;
   building a second structure identifying people within said selected user's group of said conversational partners who regularly access said systems, applications, or documents;
   identifying similarities between said first and second structures;
   identifying subsets not employed by said selected user, but matching frequently used systems, applications, or documents of said selected user's conversational partners;
   prioritizing said subsets and presenting said subsets to said selected user;
   obtaining a list of systems, applications, or documents utilized by said other users but not by said selected user; and
   granting or withdrawing access to said selected user.

10. A method of analyzing conversational patterns to position information sources and autonomic access control list management comprising:
   obtaining a list of sources from a first database;
   identifying individuals for analysis from said sources found in said first database;
   finding existing links among said identified individuals;
   calculating frequency of contacts among said identified individuals;
   matching conversational partners with said identified individuals;
   building a first structure identifying people with who said identified individuals have documented conversations;
   building a second structure identifying people within said identified individuals' groups of said conversational partners who regularly access said systems, applications, or documents;
   identifying similarities between said first and second structures;
   identifying subsets not employed by said identified individuals, but matching frequently used systems, applications, or documents of said identified individuals' conversational partners;
   prioritizing said subsets and presenting said subsets to said user;
   storing said frequency of contacts in a second database;
   obtaining a list of systems, applications, or documents from a third database;
   obtaining access control lists from said list of systems, applications, or documents;
   calculating frequency of access to said systems, applications, or documents;
   storing said frequency of access in a fourth database;
   obtaining a list of systems, applications, or documents utilized by other users but not by said identified individuals; and
   granting or withdrawing access to said identified individuals.

11. The method of claim 10 further comprising:
   building a list of systems, applications, or documents regularly accessed by conversational partners of persons who received a file or document located on one of said systems; and searching system indices for said file or document in repositories.

12. The method of claim 10 further comprising prompting said other users if said identified individuals gain access to said systems, applications, or documents, and inquiring of said identified individuals if said access is desired, or granting access to said identified individuals and opening said system, application, or document.

13. A method of analyzing conversational patterns to position information sources and autonomic access control list management comprising:
    deploying process software for analysis of conversational patterns to position information and autonomic access control list management, said deployment comprising:
        installing said process software on at least one server;
        identifying server addresses for users accessing said process software on said at least one server;
        installing a proxy server if needed;
        sending said process software to said at least one server via a file transfer protocol, or sending a transaction to said at least one server containing said process software and receiving and copying said process software to said at least one server's file system;
        accessing said process software on a user's client computer file system; and
        executing said process software by said users;
    calculating said conversational frequency patterns for a selected user from data stored in a first database;
    calculating access of systems, applications, or documents by said selected user;
    finding other users from a second database;
    obtaining a list of systems, applications, or documents utilized by said other users but not by said selected user; and
    granting or withdrawing access to said selected user.

14. The method of claim 13 wherein said step of installing said process software further comprises:
    determining if programs will reside on said at least one server when said process software is executed;
    identifying said at least one server that will execute said process software; and
    transferring said process software to said at least one servers storage.

15. The method of claim 13 wherein said step of accessing said process software includes having said at least one server automatically copying said process software to each client computer, running an installation program at each client computer, and executing said installation program on said client computer.

16. The method of claim 13 wherein sending said process software to said users via email further comprises identifying said users and addresses of said client computers.

17. The method of claim 13 wherein said step of executing said process software by said users includes sending said process software to directories on said client computers.

18. The method of claim 13 wherein said step of accessing said process software comprises sending said process software to users via email.

19. A method of analyzing conversational patterns to position information sources and autonomic access control list management comprising:
    integrating process software for analysis of conversational patterns to position information and autonomic access control list management, said integration comprising:
        determining if said process software will execute on at least one server;
        identifying said at least one server address, including checking said at least one server for operating systems, applications, network operating systems, or version numbers for validation with said process software, and identifying any missing software applications that are required for integration;
        updating said operating systems, said applications, or said network operating systems that are not validated for said process software, and providing any of said missing software applications required for said integration;
        identifying client addresses and checking said client's computers for operating systems, applications, network operating systems, or version numbers for validation with said process software, and identifying any missing software applications that are required for integration;
        updating said client's computers with said operating systems, said applications, or said network operating systems that are not validated for said process software, and providing any of said missing software applications required for said integration; and
        installing said process software on said client's computers and said at least one server;
    calculating said conversational frequency patterns for a selected user from data stored in a first database;
    calculating access of systems, applications, or documents by said selected user;
    finding other users from a second database;
    obtaining a list of systems, applications, or documents utilized by said other users but not by said selected user; and
    granting or withdrawing access to said selected user.

20. A method of analyzing conversational patterns to position information sources and autonomic access control list management comprising:
    on demand sharing of process software for analysis of conversational patterns to position information and autonomic access control list management, said on demand sharing comprising:
        creating a transaction containing unique customer identification, requested service type, and service parameters;
        sending said transaction to at least one main server;
        querying said server's central processing unit capacity for adequate processing of said transaction; and
        allocating additional central processing unit capacity when additional capacity is needed to process said transaction, and adding said additional central processing unit capacity to said server, or checking environmental capacity for processing said transaction, including network bandwidth, processor memory, or storage, and allocating said environmental capacity as required;
    calculating said conversational frequency patterns for a selected user from data stored in a first database;
    calculating access of systems, applications, or documents by said selected user;
    finding other users from a second database;
    obtaining a list of systems, applications, or documents utilized by said other users but not by said selected user; and
    granting or withdrawing access to said selected user.

21. The method of claim 20 further comprising recording usage measurements including network bandwidth, processor memory, storage, or said central processing unit cycles.

22. The method of claim 20 further comprising summing said usage measurements, acquiring a multiplicative value of said usage measurements and unit costs, and recording said multiplicative value as an on demand charge to a requesting customer.

23. The method of claim 20 further comprising posting said on demand charge on a web site if requested by said requesting customer, or sending said demand charge via email to said requesting customer's email address.

24. The method of claim 20 further comprising charging said on demand charge to said requesting customer's account if an account exists and said requesting customer selects a charge account payment method.

25. A method of analyzing conversational patterns to position information sources and autonomic access control list management comprising:

including deploying, accessing, and executing process software for analysis of conversational patterns to position information and autonomic access control list management through a virtual private network, said method further comprising:

determining if said virtual private network is required;

checking for remote access of said virtual private network;

if said remote access does not exist, identifying a third party provider to provide secure, encrypted connections between a private network and remote users, identifying said remote users, and setting up a network access server for downloading and installing desktop client software for remotely accessing said virtual private network;

accessing said process software;

transporting said process software to said remote user's desktop; and executing said process software on said remote user's desktop;

calculating said conversational frequency patterns for a selected user from data stored in a first database;

calculating access of systems, applications, or documents by said selected user;

finding other users from a second database;

obtaining a list of systems, applications, or documents utilized by said other users but not by said selected user; and granting or withdrawing access to said selected user.

26. The method of claim 25 further comprising:

determining if said virtual private network is available for site-to-site access, or installing equipment required to establish said site-to-site virtual private network, and installing large scale encryption into said virtual private network; and accessing said process software on said site-to-site configuration.

27. The method of claim 25 wherein said step of accessing said process software further comprises dialing into said network access server or attaching directly via a cable or DSL modem into said network access server.

* * * * *